United States Patent

[11] 3,613,983

| [72] | Inventor | Arthur F. Gage<br>Warren, Mich. |
|---|---|---|
| [21] | Appl. No. | 831,827 |
| [22] | Filed | June 6, 1969 |
| [45] | Patented | Oct. 19, 1971 |
| [73] | Assignee | North American Rockwell Corporation<br>Pittsburgh, Pa. |

[54] APPARATUS FOR HOLDING A STATIONARY WORKPIECE IN A FRICTION WELDING MACHINE
7 Claims, 6 Drawing Figs.

[52] U.S. Cl. .................................................. 228/2,
29/470.3, 156/73, 269/242, 269/244
[51] Int. Cl. ....................................................... B23k 27/00
[50] Field of Search .......................................... 29/470.3;
228/2; 156/73; 269/242, 244

[56] References Cited
UNITED STATES PATENTS

| 3,516,591 | 6/1970 | Gage | 228/2 |
|---|---|---|---|
| 3,455,494 | 7/1969 | Stamm | 228/2 |
| 3,417,457 | 12/1968 | Burke et al. | 29/470.3 |
| 3,388,849 | 6/1968 | Blumetal | 228/2 |
| 3,337,108 | 8/1967 | Taylor | 228/2 |
| 3,238,162 | 3/1966 | Herman | 228/2 |

Primary Examiner—John F. Campbell
Assistant Examiner—R. J. Craig
Attorneys—John R. Bronaugh, George R. Powers and Floyd S. Levison ABSTRACT: Apparatus and method for holding a stationary workpiece to be friction welded to a rotatable and axially movable workpiece, the apparatus including a pair of axially spaced-apart end clamps, a center clamp, and means for sequentially operating the clamps such that the end clamps initially grip the ends of the stationary workpiece at relatively low contact pressure, the center clamp then gripping the workpiece at relatively high contact pressure, and the end clamps then increasing the contact pressure with the workpiece to a relatively high level.

APPARATUS FOR HOLDING A STATIONARY WORKPIECE IN A FRICTION WELDING MACHINE

BACKGROUND OF THE INVENTION

1. Field of the Invention

This invention relates to means for holding a stationary workpiece during friction welding and, more particularly, to sequential clamping apparatus for accurately positioning and rigidly holding the stationary workpiece during welding. This invention also relates to a method of sequentially varying the clamping pressure on the workpiece for improved positioning at relatively low stress levels.

2. Description of the Prior Art

To friction weld together large components such as heavy steel drive axle components for large vehicles, it is necessary to apply very large axial thrust loads to the relative rotating components. While only axial forces are deliberately applied to the components, very large radial forces are generated between the rubbing components due to localized stick welds and other nonuniform conditions existing during the welding process. High strength holding devices are required to withstand these large forces and maintain the relatively rotating parts in proper alignment throughout the welding process.

The stationary component in a friction welded drive axle for large vehicles is typically a hollow steel fabricated housing having a noncylindrical center portion within which differential gearing and other necessary drive components are located and a pair of oppositely axially extending generally cylindrical end portions. The end portions have annular axially facing end faces to which suitable generally cylindrical wheel bearing spindles are friction welded, the end spindles being rotated relative to the stationary axle housing and axially forced against the end faces of the housing at high pressure during the actual welding process. It will be apparent at this point that the high strength holding devices used to hold the stationary workpiece must not only rigidly hold the workpiece during welding, but also must accurately position the cylindrical end portions and their axially facing end faces relative to the rotatable and axially movable spindles. Heretofore, this necessary positioning has been provided by means of axially spaced-apart end clamps consisting of transversely movable jaw members having face portions contoured to engage the cylindrical end portions and to move the end portions to positions coaxial with the spindles. After the end portions are gripped at high contact pressure, the center portion is gripped at high contact pressure by a center clamp. Since the center portion is noncylindrical, the pressure exerted on the center portion will normally cause some rotation and axial shifting of the center portion. With the ends already gripped at high pressure by the end clamps and thereby rigidly positioned, such rotation and shifting of the center portion commonly sets up extremely large and undesirable torsional stresses and axially oriented tensile and compressive stresses in the housing. Similar undesired stresses are also set up in the friction welding machine. Heretofore, there has been no known way to accurately position and rigidly hold a stationary workpiece, such as the center housing of a drive axle assembly for large vehicles, without setting up such undesirable and potentially damaging stresses.

SUMMARY OF THE INVENTION

It is therefore an object of this invention to provide improved clamping means for holding the stationary workpiece in friction welding apparatus.

Another object is to provide improved clamping means for accurately positioning and rigidly holding the stationary workpieces without creating undesired stresses in the workpiece and the friction welding machine.

A further object is to provide an improved method for accurately positioning and rigidly holding a stationary workpiece during friction welding thereto of a rotatable and axially movable workpiece.

Briefly stated, in carrying out the invention in one form, a friction welding machine adapted to friction weld a stationary workpiece to at least one rotatable and axially movable workpiece includes a pair of axially spaced-apart end clamps and a center clamp and operating means connected to the clamps for sequentially operating them in accordance with the novel method of the invention. More particularly, the clamps are sequentially operated such that the two end clamps initially grip the ends of the stationary workpiece at relatively low contact pressure to accurately align the ends with the associated movable workpieces, the center clamp then gripping the center portion of the workpiece at high contact pressure to rotate the center portion to a desired angular position and to axially shift the center portion to a desired axial position with the relatively low contact pressure exerted by the end clamps maintaining the axial alignment of the end portions but permitting the end portions to concomitantly shift angularly and axially so as to thereby avoid the creation of undesired stresses in the workpiece and the machine, and the end clamps thereafter increasing the contact pressure on the end portions to the level required for welding.

By a further aspect of the invention, a fluid system is provided for operating the clamps in the novel sequence of the invention, the system including a source of high pressure fluid, two-way fluid motors connected to the clamps, conduit means interconnecting the high pressure source and the motors, and valves for selectively supplying fluid from the conduit means to the motors in selected directions and at selected pressures.

DESCRIPTION OF THE DRAWINGS

While this specification concludes with claims particularly pointing out and distinctly claiming the subject matter forming the invention, the invention, together with further objects and advantages, may best be understood by reference to the following description taken in conjunction with the accompanying drawings, in which:

DETAILED DESCRIPTION

Figure 1:
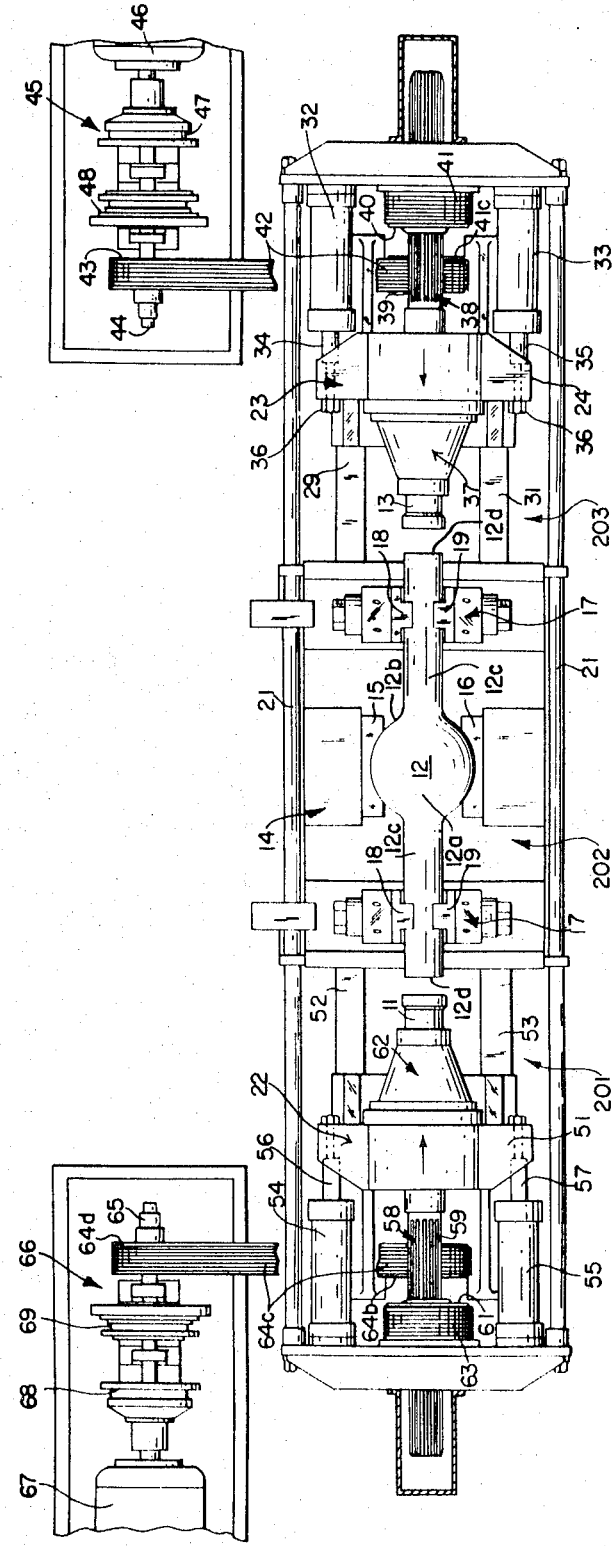
FIG. 1 is a plan view illustrating a friction welding machine incorporating the invention.

FIG. 1 illustrates a friction welding machine wherein three workpieces 11, 12, and 13 are adapted to be friction welded together. In this arrangement the central workpiece 12, which may be an axle housing center section, is held stationary and the other two workpieces 11 and 13, which may be wheel bearing end spindles, are rotated while being axially forced into engagement with opposite end faces 12d of the workpiece 12.

The stationary workpiece 12 includes a noncylindrical center portion 12a having generally vertically extending sidewalls 12b and generally cylindrical end portions 12c fabricated integrally with the hollow center portion 12a and projecting therefrom in opposite axial directions. The end portions 12c have axially facing annular end surfaces 12d to which the movable workpieces 11 and 13 are friction welded. During friction welding, the central portion 12a of the workpiece 12 is gripped by a center clamp 14 wherein the opposite sides 12b are engaged and held by jaw members 15 and 16. The oppositely extending cylindrical end portions of workpiece 12 are clamped tightly by end clamps 17, each of which has transversely opposed and movable jaw members indicated at 18 and 19 for gripping the workpiece. This arrangement supports and anchors workpiece 12 against rotation and axial displacement during welding. Clamp 14 and the end clamps 17 are secured rigidly to the machine base 21. The precise manner in which the center clamp 14 and the end clamps 17 operate will be discussed in greater particularity at a later point in this specification.

Proceeding now with a general description of the friction welding machine with particular reference to FIG. 1, workpiece 11 is mounted upon a hydrostatic bearing unit carrier 22 and workpiece 13 is mounted upon a similar hydrostatic bearing unit carrier 23 at opposite ends of base 21. These carriers 22 and 23 are mounted for axial sliding movement along the machine base 21. A pair of power cylinders 32 and 33 are fixed on base 21 with their piston rods 34 and 35 projecting into rigid connection with the frame 24 of carrier 23. Introduction of fluid under pressure into both cylinders 32 and 33 will advance the carrier 23 thereon toward the stationary workpiece 12. A shaft 38, located centrally of carrier 23 and midway between cylinders 32 and 33, has a splined section 39 which axially slidably but nonrotatably extends through the hub of an axially stationary pulley 40. Suitable belts drive the pulley 40 from an electric motor 46. Shaft 38 enters the hydrostatic bearing unit carrier 23 wherein as will appear it may be operably drive connected to rotate the workpiece 13. By confining pulley 40 against axial displacement and by providing the splined drive connection between pulley 40 and shaft 38, continuous rotation of shaft 38 and the workpiece 13 need not be interrupted as the carrier 23 is axially displaced by the power cylinders 32 and 33. Workpiece 13 may thus be axially forced into rubbing engagement with the adjacent end face 12d of the nonrotating workpiece 12 during the friction welding operation.

The workpiece 11 is held in a similar manner by the carrier 22 and may also be axially forced into rubbing engagement with adjacent end face 12d of the stationary workpiece 12 during the welding operation. Since the present invention relates to the manner by which the stationary workpiece 12 is positioned and held by the center clamp 14 and the end clamps 17, the detailed nature of the supporting structure for the workpieces 11 and 13 will not be described herein. If such a description is desired for any reason, attention is directed to copending Pat. application Ser. No. 769,892, entitled "Friction Welding Apparatus Having Improved Hydrostatic Bearing Arrangement," filed on Oct. 23, 1968, in the name of Alex F. Stamm and assigned to the assignee of this invention.

Figure 2:
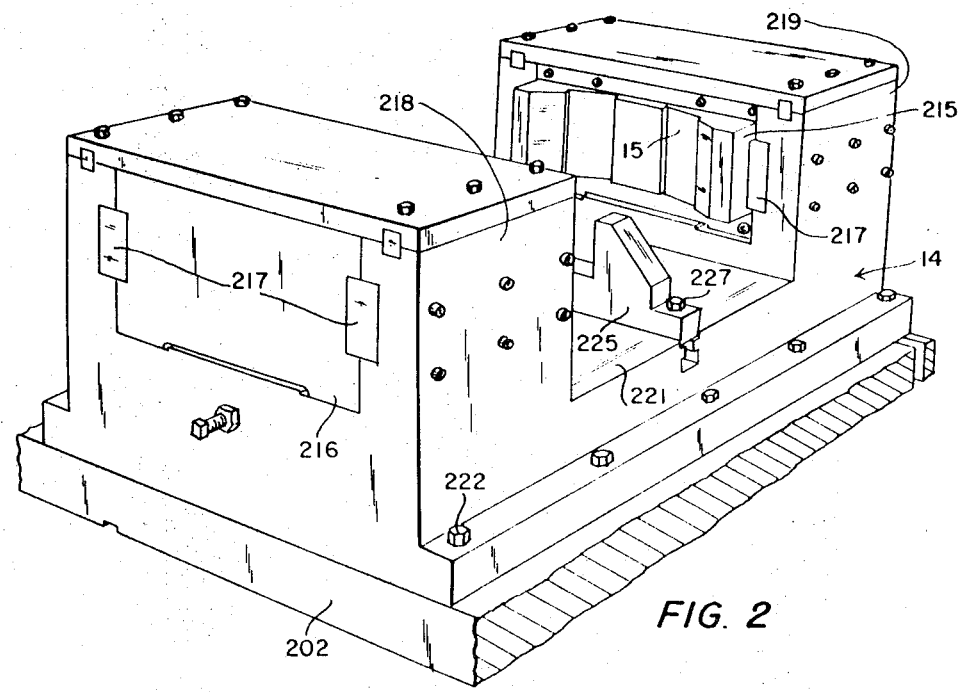
FIG. 2 is a generally perspective view of the center clamp for holding the stationary workpiece.
Figure 3:
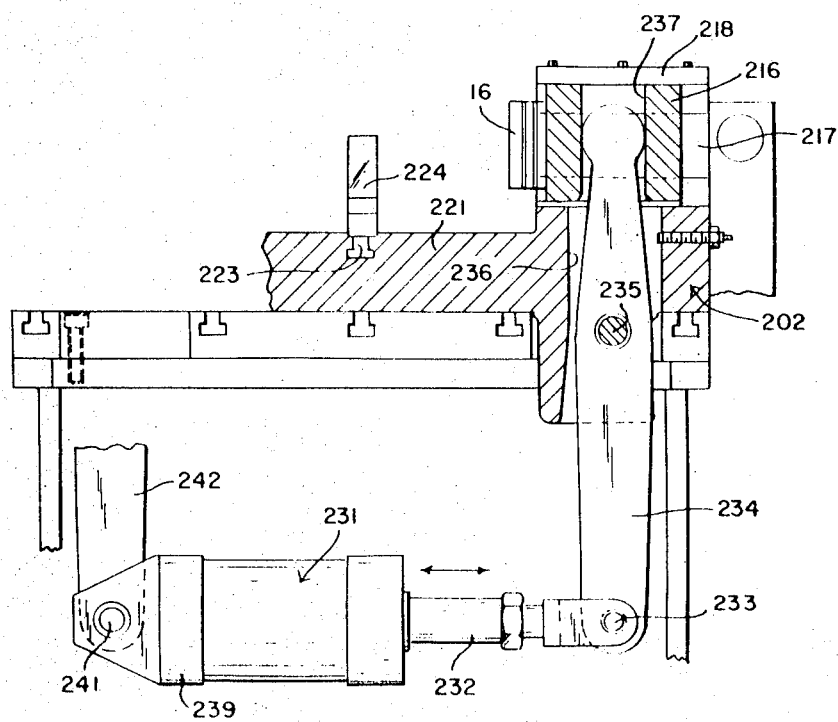
FIG. 3 is a fragmentary view partly broken away and in section showing the mechanism for moving the center clamp jaw members.

Referring now to FIGS. 1 through 3, the center clamp 14 for holding the noncylindrical center portion of the stationary workpiece 12 includes transversely movable jaw members 15 and 16 having contoured face portions facing each other along an axis transverse to the axis of rotation of the workpieces 11 and 13. Jaws 15 and 16 are fixed on blocks 215 and 216 slidably mounted in transverse alignment on guideways 217 in laterally opposite columns 218 and 219 which form part of a U-shaped casting 221. Columns 218 and 219 extend upwardly from the crosspiece of casting 221 which is rigidly secured to the support structure as by bolts 222.

Midway between jaws 15 and 16, the crosspiece 221 is formed with a rectangular keyway 223 extending longitudinally on the machine centerline and in which are adjustably mounted a pair of positioning members 224 and 225 that may be locked by bolts 226 and 227 respectively. These members 224 and 225 are positioned to project upwardly into an opening in the center portion 12a of the workpiece 12 when it is first placed in the machine with the clamps 14 and 17 all open. In this manner, the housing 12 is initially positioned axially and angularly.

Still referring to FIGS. 1-3 and the center clamp 14, a fluid pressure cylinder 231 suitably mounted within the interior of the machine has its slidable piston rod 232 connected pivotally at 233 to a generally vertically extending lever 234 rockable about a fixed pivot 235 on the base. The upper end of lever 234 extends freely through an opening 236 in the machine base into the recessed interior 237 of jaw block 216 where it is slidably received. Similarly, casing 239 of the cylinder is pivoted at 241 to the lower end of a lever 242 connected to the jaw block 215 in a similar manner. Levers 234 and 242 are of the same length and effective leverage.

In operation, the parts are generally as shown in FIG. 3 when the clamp 14 is open, the levers 234 and 242 being vertical, the jaws 15 and 16 being retracted, and the horizontal cylinder 231 being in its contracted condition. When fluid under pressure is supplied to cylinder 231 so as to expand the cylinder, rod 232 is extended. This oppositely rocks both levers 234 and 242 to displace jaws 15 and 16 toward each other to grip the stationary workpiece 12. Due to the length of these levers a considerable clamping force proportional to the pressure of the fluid supplied to the cylinder 231 is provided, and due to the interconnection of the levers by the fluid pressure cylinder 231, relative transverse displacement of the jaws is permitted to insure an even centered grip on the stationary workpiece. Assuming for a moment that the positioning members 224 and 225 and the end clamps 17 impose no restraint, it will be obvious that the clamping operation just described will, due to the contoured faces of the jaw members 15 and 16, tend to rotate and axially shift the center portion 12a to an equilibrium position. Since the workpiece 12 is a fabricated member, such shifting will almost always tend to occur no matter how precisely the positioning members 224 and 225 are located. As this description proceeds, it will be seen that this sort of shifting is permitted by the improved apparatus of this invention.

Figure 4:
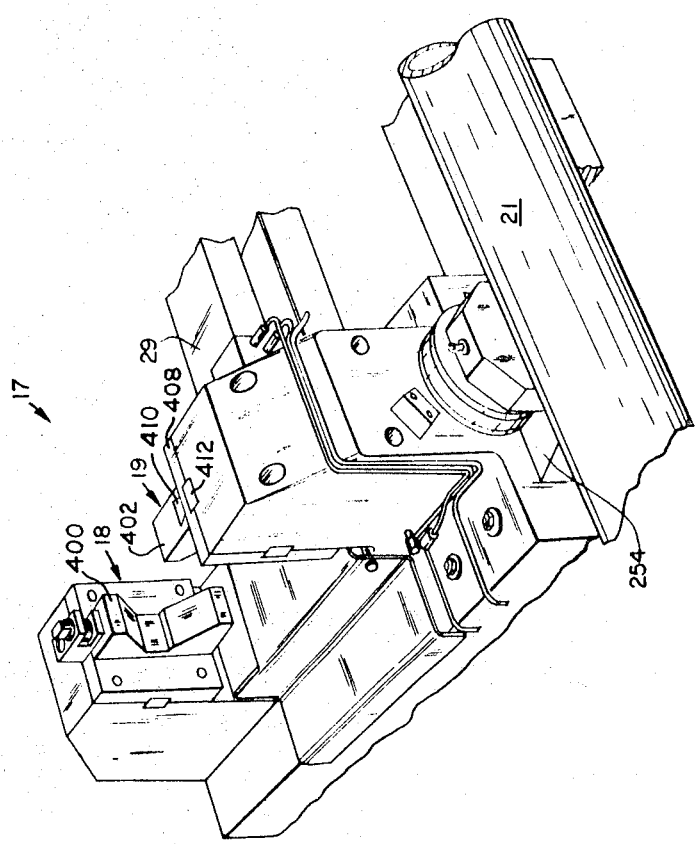
FIG. 4 is a generally perspective view of one of the end clamps.
Figure 5:
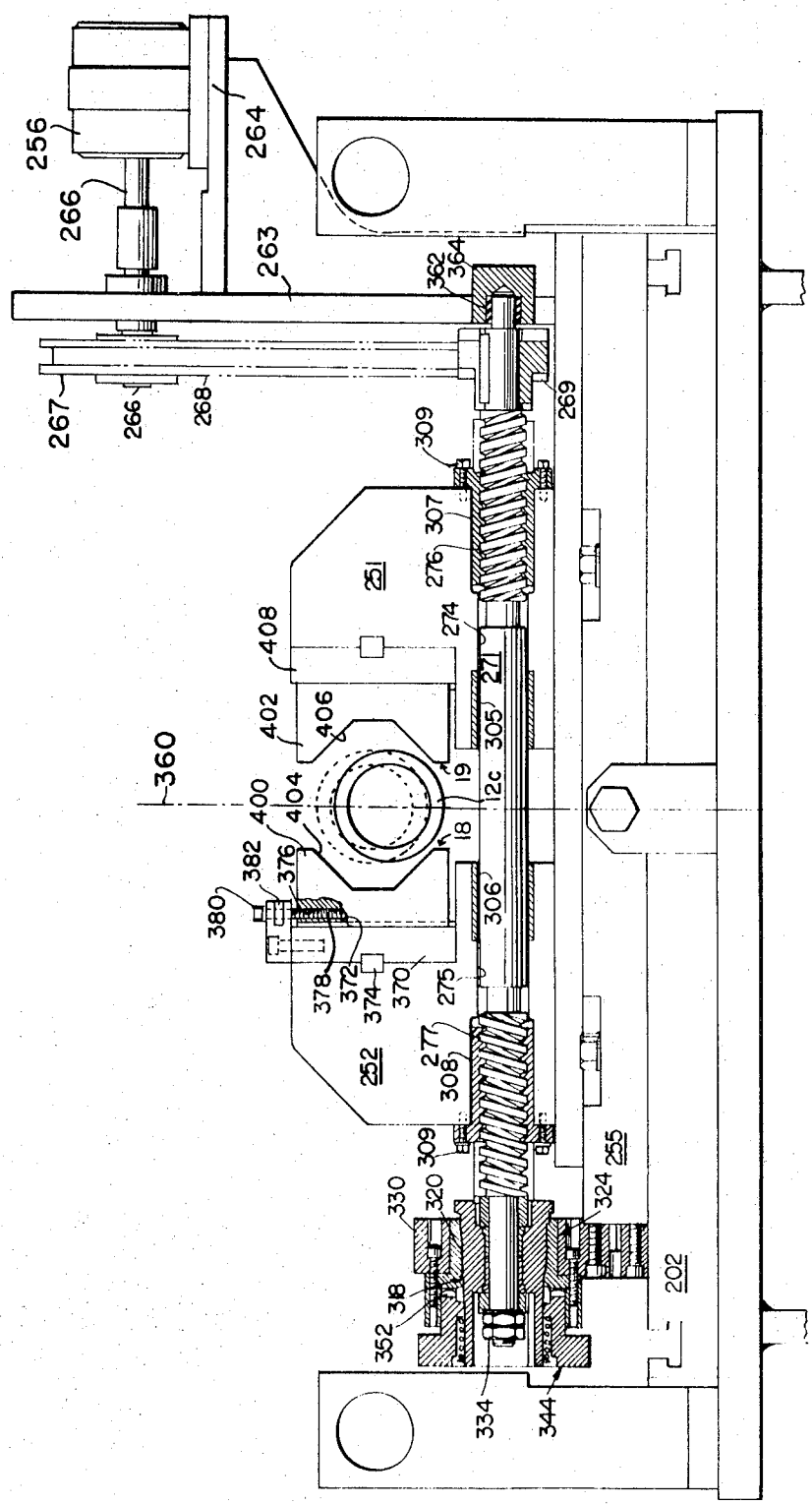
FIG. 5 is an end elevation view, partially in section, of the end clamp structure of FIG. 5.

Referring now to FIGS. 4 and 5, one of the end clamps 17 will be described. As viewed therein, the jaws 18 and 19 are actually jaw members 400 and 402 having contoured workpiece engaging surfaces 404 and 406, respectively, thereon facing each other along an axis transverse to the axis of rotation of the rotating workpieces. The member 400 is movably mounted on a mounting plate 370 secured to an intermediate member or column 252. Member 402 is mounted on mounting plate 408 for limited vertical floating movement by a vertical guide key 410, and mounting plate 408 is in turn keyed to intermediate member or column 251 by key 412. The member 402 will thus align itself with the adjusted position of the member 400 when both members are moved transversely to engage and clamp the associated cylindrical end portion 12c of the workpiece 12 in place.

The manner by which the workpiece engaging surfaces 404 and 406 of the jaw member 400 and 402 are moved transversely to the axis of rotation will now be described with reference to FIG. 5. As illustrated, the base plate 255 has secured thereto an upright member 263 having a support 264 mounting a fluid motor 256, the output shaft 266 of which carries a sprocket 267 connected by chain 268 to a sprocket 269 on a horizontal shaft 271. The shaft 271 is journaled in bores 274 and 275 of the columns 251 and 252, respectively, by sleeve bearing 305 and 306. Shaft 271 is formed with oppositely threaded sections 276 and 277 of the acme thread type. Flanged retainer sleeves 307 and 308, which are respectively fixed to columns 251 and 252 by machine screws 309, are respectively received in bores 274 and 275 and are internally threaded to respectively engage the threaded shaft sections 276 and 277 so that rotation of shaft 271 in one direction will advance members 400 and 402 toward each other into gripping relation with the cylindrical end portion 12c of the stationary workpiece 12 and rotation in the other direction will move them away from each other.

Assuming now that a workpiece 12 has been initially positioned in the machine by the members 224 and 225 of FIGS. 2 and 3 with the clamps 14 and 17 all open, the end portions 12c will be vertically positioned as illustrated by solid lines in FIG. 5. To be axially aligned with the workpieces 11 and 13, it is essential that the cylindrical end portions be raised vertically to the position illustrated by broken lines. It has heretofore been found that this can be accomplished by initially maintaining the jaw members 15 and 16 of the center clamp 14 in their open positions and closing the jaw members 400 and 402 of both end clamps 17. As the members 400 and 402 move toward each other, the face surfaces 404 and 406 will engage the end portions 12c and lift the end portions 12c to the broken line position. This will, of course, also lift the center portion 12a slightly off of the positioning members 224 and 225. The center clamp 14 is then closed to rigidly hold the center portion. Heretofore, this approach has resulted in the creation of undesired and potentially destructive stresses since the center clamping operation tends to shift the center portion 12a angularly and axially. Unfortunately, this shifting has heretofore been substantially prevented since the end portions 12c have been previously clamped rigidly in position.

In accordance with the method of this invention, the end clamps 17 are initially closed with relatively low contact pressure on the end portions 12c, the contact pressure being sufficient to lift the stationary workpiece 12 into proper axial alignment with the movable workpieces 11 and 13. The center clamp 14 is then closed with relatively high contact pressure to rigidly position the center portion 12a, the low contact pressure exerted by the end clamps 17 permitting the end portions 12c to shift angularly and axially therein. In this manner, the workpiece 12 is positioned without the creation of undesired stresses. Finally, the contact pressure exerted by the end clamps 17 is increased to that of the center clamp 14. Upon the completion of welding, the clamps 14 and 17 are simultaneously released.

Figure 6:
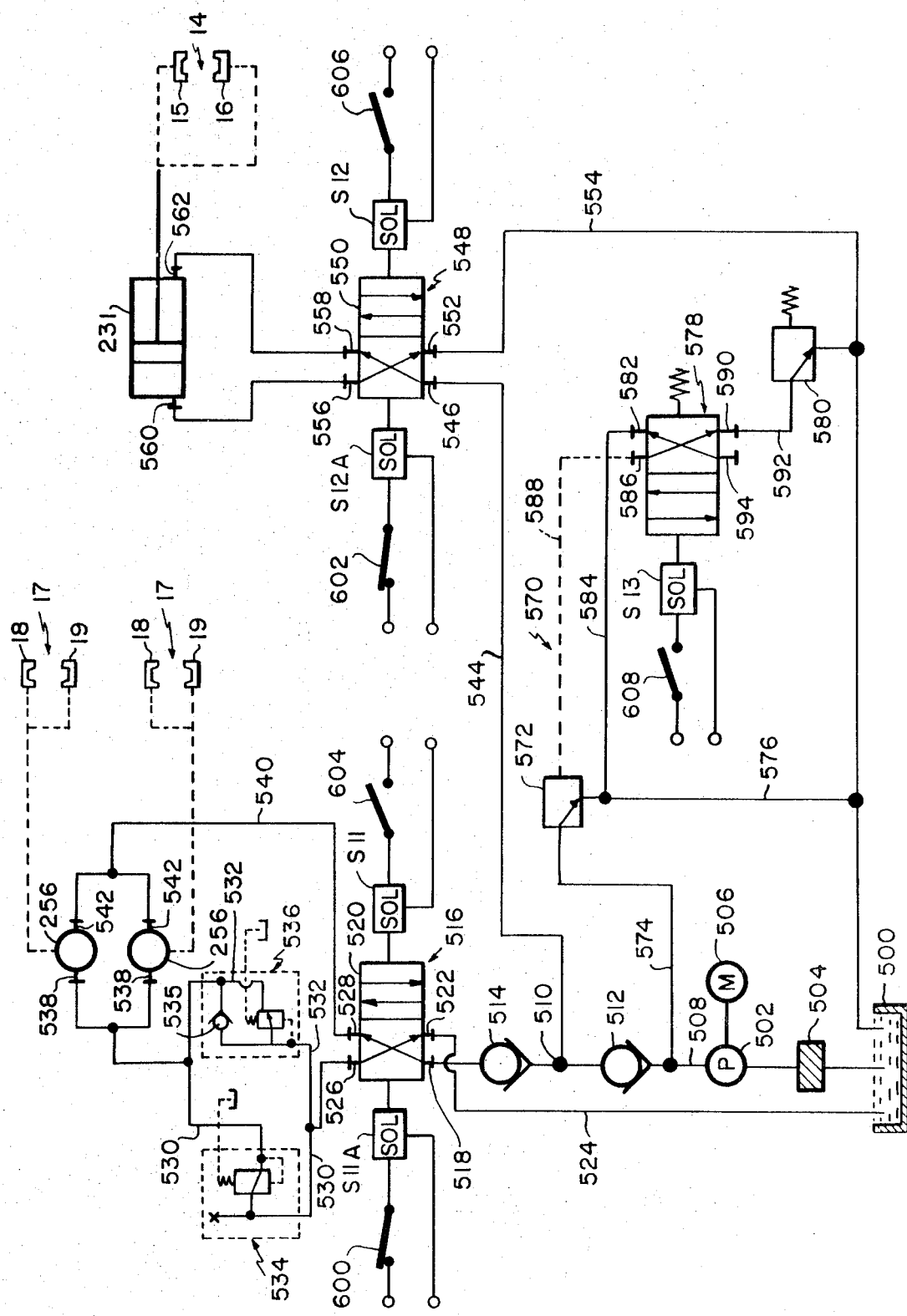
FIG. 6 is a diagrammatic view of a hydraulic circuit for operating the clamps of FIGS. 2–6.

Suitable apparatus for performing the invention will now be described with reference to FIG. 6. As shown by FIG. 6, the hydraulic motors 256 and 231 for the end clamps 17 and the center clamp 14, respectively, are connected to a hydraulic circuit which includes a sump 500 to which a pump 502 is connected through a filter 504. The pump 502 is continuously driven by a motor 506 to withdraw hydraulic fluid from the sump 500 and to deliver it to a first conduit 508 at high pressure. The conduit 508 has an outlet 510 interposed between a pair of check valves 512 and 514, which prevent reverse flow of the hydraulic fluid. The outlet 510 of the first conduit 508 is connected through the check valve 514 to the inlet port 518 of a dual solenoid-operated four-way control valve 516 having a core element 520 movable between first and second end positions and illustrated in FIG. 6 in its second end position. The control valve 516 has an outlet port 522 connected to an exhaust conduit 524 leading to the sump 500 and a pair of operating ports 526 and 528. The operating port 526 is connected to the inlets of second and third conduits 530 and 532, the second conduit 530 having a pressure reducing valve 534 therein and the third conduit 532 having a sequencing valve 536 therein. The second and third conduits 530 and 532 downstream of the valves 534 and 536 are connected to each other and a port 538 of each of the hydraulic motors 256. The other operating port 528 of the control valve 516 is connected by a fourth conduit 540 to a port 542 of each of the hydraulic motors 256.

As indicated above, the four-way control valve 516 is solenoid operated, its core element 520 being movable between a first operative position and the second illustrated operative position by means of a pair of solenoids S11 and S11A. When solenoid S11A is energized and solenoid S11 is deenergized, the core element 520 is positioned in its second position so that the inlet port 518 and the operating port 528 are interconnected and so that the operating port 526 and the discharge port 522 are interconnected for fluid flow in the directions indicated by the arrows. If pressurized fluid is supplied to the inlet port 518 with the core element 520 in this second position, the fluid will be supplied through the conduit 540 to the hydraulic motors 256 in a direction to open the end clamps 17. If, however, solenoid S11 is energized and solenoid S11A is deenergized, the core element 520 will be shifted to its first position in which the inlet port 518 and the operating port 526 are interconnected and in which the operating port 528 and the discharge port 522 are interconnected. In such a case, fluid will be supplied to the ports 538 of the hydraulic motors 256 for closing the end clamps 17 with a contact pressure proportional to the pressure of the fluid supplied to the hydraulic motors 256. As this description proceeds, it will be seen that the valves 534 and 536 are instrumental in controlling the pressure of the fluid supplied to the motors 256.

The outlet 510 of the first conduit 508 is also connected to a fifth conduit 544 which is connected at its outlet to the inlet port 546 of a dual solenoid-operated four-way control valve 548 having a core element 550 movable between first and second end positions and illustrated in FIG. 6 in its second end position. The control valve 550 has an outlet port 552 connected to an exhaust conduit 554 leading to the sump 500 and a pair of operating ports 556 and 558. The operating port 556 is connected to a port 560 of the hydraulic cylinder or motor 231 which operates the center clamp, and the operating port 558 is connected to a port 562 of the motor 231.

As indicated above, the four-way control valve 548 is solenoid operated, its core element 550 being movable between a first operative position and the second illustrated operative position by means of a pair of solenoids S12 and S12A. When solenoid S12A is energized and solenoid S12 is deenergized, the core element 550 is positioned in its second position so that the inlet port 546 and the operating port 558 are interconnected and so that the operating port 556 and the discharge port 552 are interconnected for fluid flow in the directions indicated by the arrows. If pressurized fluid is supplied to the inlet port 546 with the core element 550 in this second position, the fluid will be supplied to the inlet port 562 of the hydraulic cylinder 231 to move the internal piston to the left to contract the cylinder and open the center clamp 14. If, however, solenoid S12 is energized and solenoid S12A is deenergized, the core element 550 will be shifted to its first position in which the inlet port 546 and the operating port 556 are interconnected and in which the operating port 558 and the discharge port 552 are interconnected. In such a case, fluid will be supplied to the port 560 of the hydraulic cylinder 231 for expanding the cylinder 231 and closing the center clamp 14 with a contact pressure proportional to the pressure of the fluid supplied to the hydraulic cylinder 231.

As shown in FIG. 6, a pressure control valve means 570 is connected to the first branch conduit 508 intermediate the pump 502 and the check valve 512 for circulating hydraulic fluid back to sump 500 without its having passed through control valves 516 and 548 for operating motors 256 and 231. The pressure control means 570 includes a relief valve 572. The inlet port of valve 572 is connected by a conduit 574 to the conduit 508 and the discharge port is connected to a conduit 576 leading to the sump 500. Valve 572 cooperates with a solenoid-operated four-way valve 578 and a further relief valve 580 to control the fluid pressure supplied to the outlet 510 of the conduit 508.

One operating port 582 of valve 578 is connected to conduit 576 by a conduit 584. The other operating port 586 of valve 578 is operatively connected by a pilot vent passage 588 to the valve 572. One outlet port 590 of valve 578 is connected by conduit 592 to the inlet port of the relief valve 580, and the remaining port 594 of valve 314 is blocked. The outlet of valve 580 is connected to sump 500 as shown. Operation of valve 578 is controlled by a solenoid S13. As will be described in greater detail shortly, valve 572 is operated by shifting valve 578 to supply fluid at either a relatively high pressure or a relatively low pressure to the outlet 510 of the conduit 508.

The assembly of valves 572 and 578 and their arrangement with valve 580 is conventional. Valves 572 and 578 may be manufactured as a single unit such as the Vickers Co. Model CT5–06–A–B–20.

When solenoid S13 is deenergized, valve 578 is spring biased to its illustrated position where passage 588 is connected to conduit 592 through one of the internal valve passages. Flow through the other valve passage is blocked as shown. When valve 578 is in this position, the pressure maintained by valve 572 is relatively low. Valve 580 is set to provide relief by circulating oil back to sump 500 for maintaining the pressure at the outlet 510 of conduit 508 relatively low. Energization of solenoid S13 shifts valve 578 to a position where the connections of conduit 584 and passages 588 will be reversed. Flow of oil through passage 588 will therefore be blocked, and the pressure maintained by valve 572 at the outlet 510 of the conduit 508 will be increased to a relatively high value. In the actual practice of the present invention in the friction welding of large axle components, it has been found that the relatively high pressure can conveniently be about 1000 p.s.i.g. and that the relatively low pressure can be about 500 p.s.i.g.

Turning attention back to the valves 534 and 536, the pressure reducing valve mechanism 534 is selected to pass fluid at pressures up to, but not exceeding, the relatively low pressure. Thus valve 534 will supply fluid to the motors 256 at the pressure at which fluid is supplied to it from the outlet 510 or the relatively low pressure, whichever is lower. Sequence valve mechanism 536 is selected to prevent flow therethrough until the pressure of fluid supplied to it from the outlet 510 is substantially higher than the relatively low pressure, but less than the high pressure. To illustrate, where the pressure control means 570 is designed to supply fluid at either 500 or 1000 p.s.i.g., the pressure reducing valve 534 will be selected to transmit fluid at pressures up to 500 p.s.i.g. and the sequence valve 536 will be adapted to open at about 900 p.s.i.g. The sequence valve 536 includes a check valve 535 integral therewith for returning fluid to the sump 500 when fluid is supplied through conduit 540. The valves 534 and 536 are conventional pressure reducing and sequencing valves and are schematically illustrated in FIG. 6 by conventional symbolism.

While it will be obvious to those skilled in the art that the relatively high and low pressures can and should be varied in accordance with specific welding conditions, the illustrated levels of 500 p.s.i.g., 1000 p.s.i.g., and 900 p.s.i.g. will be used hereafter in this description to describe the operation of the friction welding apparatus.

At the initiation of a welding cycle, the clamps 14 and 17 are all open, the solenoids S11A and S12A being energized and the solenoids S11 and S12 being deenergized. The pump 502 is supplying hydraulic fluid at a high pressure, but the solenoid S12 is deenergized and the pressure control mechanism 570 therefore reduces the pressure at the outlet 510 to 500 p.s.i.g. This pressure is utilized to hold the clamps 14 and 17 in their open positions. As illustrated by FIG. 6, electric contacts 600 and 602 are closed to energize solenoids S11A and S12A, and contacts 604, 606, and 608 are open so that solenoids S11, S12, and S13 are deenergized.

With the clamps 14 and 17 all open, the stationary workpiece 12 is positioned in the machine by the operator, and contacts 604 are closed to energize solenoid S11 and contacts 600 are opened simultaneously to deenergize solenoid S11A so as to shift the core element 520 of the valve 516 to the first position and thereby initiate closing of the jaws 18 and 19 of the end clamps 17. The fluid supplied to the outlet 510 is supplied through the second conduit 530 and the valve 534 to the fluid motors 256. The maximum pressure transmitted under these conditions is limited by the valve 534 to 500 p.s.i.g. The proportional contact pressure exerted by the end clamps 17 on the cylindrical end portions 12c of the workpiece 12 is sufficient to lift the end faces 12d into axial alignment with the movable workpieces 11 and 13.

After the end portions 12c are positioned, the contacts 606 and 608 are closed to energize the solenoids S12 and S13 and the contacts 602 are opened simultaneously and deenergize solenoid S12A. The result is to shift the core element 550 of valve 548 to its first position so as to thereby close the jaw members 15 and 16 of the center clamp 14 and permit the pressure at the outlet 510 to gradually increase as the center portion 12a is gripped. As the pressure at the outlet 510 builds up, the actual pressure is transmitted through the conduit 544 to the valve 548 and the motor 231 to exert proportionately high contact pressure on the center portion 12a of the housing 12. Until the actual pressure at the outlet 510 exceeds 900 p.s.i.g., however, no flow occurs through conduit 532 and valve 536, valve 534 limiting the pressure at the motors 256 to 500 p.s.i.g. As a result, the contact pressure at the end clamps is maintained low enough to permit angular and axial shifting of the end portions 12c as the center clamp pressure builds up above 500 p.s.i.g. After 900 p.s.i.g. is reached at the outlet 510, the valve 536 opens to increase the contact pressure at the end clamps to the higher level existing at the outlet 510, after which the pressure at the motors 256 and 231 increases to the maximum pressure of 1000 p.s.i.g. permitted by the pressure control means 570. The high contact pressure at the clamps 14 and 17 corresponding to the pressure of 1000 p.s.i.g. at the motors is maintained during welding. Upon completion of welding, the contacts 600, 602, 604, 606 and 608 are returned to the positions illustrated by FIG. 6 to open the clamps 14 and 17 and reduce the pressure at the outlet 510 to 500 p.s.i.g.

It will occur to those skilled in the art that the sequential operation of the electric contacts 600, 602, 604, 606 and 608 and consequently the clamps 14 and 17 can be manually performed by the machine operator or automatically performed by any suitable timing mechanism.

From the foregoing, it will appreciated that this invention provides an improved method and apparatus for accurately positioning and rigidly holding a stationary workpiece during friction welding thereto of a rotatable and axially movable workpiece without the creation of undesired clamping stresses in the stationary workpiece.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description.

What is claimed as new and is desired to secure by Letters Patent is:

1. In a friction welding machine for welding a stationary workpiece having a pair of axially spaced-apart generally cylindrical end portions and a noncylindrical center portion and at least one generally cylindrical rotatable and axially movable workpiece into an integral assembly, improved clamping apparatus for accurately positioning and rigidly holding the stationary workpiece during welding, said clamping apparatus comprising:

a pair of end clamps axially spaced apart along the axis of rotation of the movable workpiece, each of said end clamps including a pair of opposed transversely movable jaw members having face portions contoured to engage and move an associated cylindrical end portion of the stationary workpiece to a position coaxial with the axis of rotation of the movable workpiece when said jaw members are closed and to release the end portion when said jaw members are opened, a center clamp axially intermediate said end clamps including a pair of opposed transversely movable jaw members having face portions contoured to engage and rotate the noncylindrical center portion of the stationary workpiece to a predetermined angular position relative to the axis of rotation of the movable workpiece and to axially shift the center portion to a predetermined axial position when said jaw members are closed and to release the center portion when said jaw members are opened, and operating means connected to said end clamps and said center clamp for sequentially closing said end clamps to initially grip the cylindrical end portions of the stationary workpiece at relatively low contact pressure to position said end portions on the axis of rotation of the movable workpiece, closing said center clamp to grip the center portion of the workpiece at relatively high contact pressure to rotate the center portion to said predetermined angular position and to shift the center portion to said predetermined axial position with the low contact pressure exerted by said end clamps permitting concomitant rotation and axial movement of said cylindrical end portions therein, and increasing the contact pressure of said end clamps on the cylindrical end portions to relatively high contact pressure.

2. In a friction welding machine, clamping apparatus as defined by claim 1 in which said operating means for said end clamps and said center clamp comprises:

a pair of first fluid motors each having first and second ports, means operatively connecting each of said fluid motors to a respective one of said end clamps to close said end clamp when fluid under pressure is supplied to said first port with the contact pressure exerted by said end clamp being proportional to the pressure of the fluid supplied to said first port and to open said end clamp when fluid under pressure is supplied to said second port, a second fluid motor having first and second ports, means operatively connecting said second fluid motor to said center clamp to close said center clamp when fluid under pressure is supplied to said first port with the contact pressure exerted by said center clamp being proportional to the pressure of the fluid supplied to said first port and to open said center clamp when fluid under pressure is supplied to said second port, a source of high pressure fluid, conduit means interconnecting said source of high pressure fluid and each of said fluid motors, and control means selectively controlling the port of each of said fluid motors connected to said conduit means and the pressure of the fluid supplied to each of said selected ports.

3. In a friction welding machine, clamping apparatus as defined by claim 2 in which said conduit means comprises:

a first branch conduit having an inlet communicating with said source of high pressure fluid and an outlet, second and third branch conduits each having an inlet and an outlet communicating with the first ports of said first fluid motors, a fourth branch conduit having an inlet and an outlet communicating with the second ports of said first fluid motors, a first fluid motor valve having a first position interconnecting the outlet of said first branch conduit to the inlets of said second and third branch conduits and a second position interconnecting the outlet of said first branch conduit to the inlet of said fourth conduit, first pressure control means in said second branch conduit for limiting the pressure of fluid supplied therethrough to said relatively low level, second pressure control means in said third branch conduit for permitting fluid flow therethrough only when the pressure at the inlet of said third branch conduit is substantially greater than said relatively low level and not exceeding said relatively high level, a fifth branch conduit having an inlet communicating with the outlet of said first branch conduit and an outlet, a second fluid motor valve having a first position interconnecting the outlet of said fifth branch conduit to the first port of said second fluid motor and a second position interconnecting the outlet of said fifth branch conduit to the second port of said second fluid motor, and third pressure control means in said first branch conduit having a first position for limiting the pressure of fluid supplied therethrough to said relatively low level and a second position for limiting the pressure of fluid supplied therethrough to said relatively high level, and in which said control means comprises:

means operatively connected to said first and second fluid motor valves and said third pressure control means to initially position said first fluid motor valve in said first position, and second fluid motor valve in said second position, and said third pressure control means in said first position and to thereafter shift and second fluid motor valve to said first position and said third pressure control means to said second position.

4. In a friction welding machine, clamping apparatus as defined by claim 3 in which the sequential operation of said operating means for said end clamps and said center clamp includes a final operating condition in which said end clamps and said center clamp are simultaneously opened to permit removal of integral assembly upon completion of welding, said control means providing said final operating condition by shifting said first and second fluid motor valves to said second position upon completion of welding.

5. In a friction welding machine, clamping apparatus as defined by claim 4 in which said source of high pressure fluid comprises a sump and a pump communicating with said sump, said clamping apparatus further comprising secondary conduit means interconnecting said first and second fluid motor valves and said sump for returning exhausted fluid from said fluid motors to said sump, said first and second fluid motor valves including means interconnecting in each position of said fluid motor valves the nonselected port of the associated fluid motor to said secondary conduit means.

6. In a friction welding machine, clamping apparatus as defined by claim 4 in which the means connected to said first and second fluid motor valves and said third pressure control means comprises solenoids.

7. In a friction welding machine for welding a stationary workpiece having a pair of axially spaced-apart end portions and a center portion and at least one rotatable and axially movable workpiece into an integral assembly, improved clamping apparatus for accurately positioning and rigidly holding the stationary workpiece during welding, said clamping apparatus comprising:

a pair of end clamps axially spaced apart along the axis of rotation of the movable workpiece, each of said end clamps including a pair of opposed movable jaw members having face portions contoured to engage and move an associated end portion of the stationary workpiece to a position coaxial with the axis of rotation of the movable workpiece when said jaw members are closed and to release the end portion when said jaw members are opened, a center clamp axially intermediate said end clamps including a pair of opposed movable jaw members having face portions contoured to engage the center portion of the stationary workpiece and to axially shift the center portion to a predetermined axial position when said jaw members are closed and to release the center portion when said jaw members are opened, and operating means connected to said end clamps and said center clamp for sequentially closing said end clamps to initially grip the end portions of the stationary workpiece at relatively low contact pressure to position said end portions on the axis of rotation of the movable workpiece, closing said center clamp to grip the center portion of the workpiece at relatively high contact pressure to shift the center portion to said predetermined axial position with the low contact pressure exerted by said end clamps permitting concomitant axial movement of said end portions therein, and increasing the contact pressure of said end clamps on the end portions to relatively high contact pressure.

UNITED STATES PATENT OFFICE
CERTIFICATE OF CORRECTION

Patent No. 3,613,983      Dated October 19, 1971

Inventor(s) ARTHUR F. GAGE

It is certified that error appears in the above-identified patent and that said Letters Patent are hereby corrected as shown below:

Column 5, line 28, after "Suitable" insert ---control---.

Column 6, line 68, should read "CT5-06-1A-B-20."

Column 10, line 6, after "shift" delete "and" and insert in lieu thereof ---said---.

Signed and sealed this 4th day of July 1972.

(SEAL)
Attest:

EDWARD M. FLETCHER, JR.
Attesting Officer

ROBERT GOTTSCHALK
Commissioner of Patents